United States Patent [19]

Obear

[11] Patent Number: 5,021,763

[45] Date of Patent: Jun. 4, 1991

[54] ENVIRONMENT PROTECTED INDUSTRIAL MICROCOMPUTER

[76] Inventor: Robert F. Obear, 7116 Spada Rd., Snohomish, Wash. 98290

[21] Appl. No.: 473,441

[22] Filed: Feb. 1, 1990

[51] Int. Cl.[5] .......................... G08B 1/00; G06F 15/02
[52] U.S. Cl. ..................................... 340/407; 298/1 R; 298/1 C; 364/708; 361/380; 361/390; 361/395; 361/381; 358/229; 358/254; 248/562
[58] Field of Search ................... 340/407, 720, 815.14; 298/1 R, 1 A, 1 B, 1 C, 1 E, 1 F, 1 G, 1 I, 1 J; 248/562, 636; 364/708, 413.3, 423; 358/229, 254; 361/331, 380, 381, 382, 390–397, 400, 424; 312/208, 271, 249–253

[56] References Cited

U.S. PATENT DOCUMENTS 3,903,404 9/1975 Beall et al. ........................... 364/708
4,742,477 5/1988 Phillips et al. ....................... 364/708

*Primary Examiner*—Donnie L. Crosland
*Attorney, Agent, or Firm*—Larry A. Jackson

[57] ABSTRACT

An environmentally sealed, EMI suppressed shock/vibration protected microcomputer workstation is provided by a sealed enclosure of stainless steel having a lower base portion for containing a dampened, spring suspension platform carrying the CPU and electronics, and an upper hood portion for housing the CRT which is removably held in place by a unique arrangement of support pins that cooperatively seat in quick release brackets affixed to the enclosure's interior walls. A front panel of the base portion mounts a stainless steel tactile dome keyboard retained and sealed about its perimeter within a stainless steel casement that in turn is welded to the stainless steel walls of the base portion. The enclosure further includes a labyrinth cable seal assembly for entry of standard flexible cables without need for special fittings, a magnetic disk drive port having a removable marine-type circular compression seal closure, and a fluid port for circulation of coolant to an internal fluid-to-air heat exchanger for removing heat build-up from the interior of the housing.

20 Claims, 17 Drawing Sheets

ENVIRONMENT PROTECTED INDUSTRIAL MICROCOMPUTER

BACKGROUND OF THE INVENTION

The present invention relates to microcomputers and more particularly to microcomputers constructed and enclosed so as to be suitable for use in extreme environmental conditions encountered in industrial applications.

The advent of microcomputer workstations and terminals has expanded the use of computers to a wide variety of industrial environments. Oftentimes it is desirable to locate a microcomputer workstation right in a work area of a manufacture assembly line, marine, chemical, or other industrial processing station so that the operator has access both to the computation and database resources of the microcomputer at the work site, be it a factory floor, fish processing area, chemical processing plant, or other industrial work area where the microcomputer is exposed to extreme environment conditions. These extreme operating conditions may include exposure to water, corrosive chemicals, oils, mechanical shock, vibration, wide temperature swings, and similar harsh environments that are not normally present in business office computer installations.

For example, many industrial microcomputer installations require all equipment in the work area to be hosed down periodically to clean the workstation of corrosive salt water, oils, or other chemicals.

Additionally, many industrial workstations have stringent limitations on the level of electromagnetic interference that can be tolerated. The electromagnetic emissions of any electronic or electrical equipment is therefore tightly controlled and this in turn imposes further design constraints on the enclosure used to house the industrial microcomputer.

Various efforts have been made to provide protective enclosures for microcomputers. However, partial solutions have created new problems. Tight enclosures result in extensive heat build-up within the enclosure due to the resistive losses of the electrical components, especially the heat generated by display cathode ray tubes (CRTs). Furthermore, a design of an enclosure to protect against one environmental condition often renders the microcomputer vulnerable to other extreme conditions. Further still, the protection of the microcomputer against all of the external environmental conditions must be accomplished with an enclosure that contains (suppresses) electromagnetic emissions that are inherently present in the operation of microcomputer electronics and the associated CRT display.

Added to the foregoing considerations is the need to accommodate cabling and other wiring to and from the microcomputer electronics. Where the cabling is of the flexible type common in the use of microcomputers, the difficulty of providing a sealed entry port for existing flexible cabling without the need to rewire the system through hard case conduit, has not been adequately accommodated in existing sealed computer workstations. Frequent changes of cabling must also be accommodated.

A standard keyboard readily accessible to the operator likewise needs to be sealed from environmental extremes and must contain EMI emissions.

The mechanical vibration and shock to which these industrial microcomputer units are subjected also presents severe design and engineering problems. Adequate vibration and shock protection must be provided without sacrificing the other needed features of waterproof sealing and a housing that is impermeable to most all corrosives.

The enclosure should accommodate simple and quick access to the internal components, especially the CRT display and CPU electronics, while housing both in unitary structure.

BRIEF SUMMARY OF THE INVENTION

An environmentally sealed, EMI suppressed shock-/vibration protected microcomputer workstation is provided by a dampened, spring suspension mounting of the CPU and CRT display within a sealed enclosure of stainless steel. The unique construction accommodates use in extreme operating conditions including exposure to water, oil, corrosive chemicals, mechanical shock, vibration and wide temperature variations. Stainless steel sheet walls are fabricated by seam welding into the shape of a lower base portion for the CPU and electronics, and an upper hood portion for enclosing the CRT display. A front panel of the base portion mounts a stainless steel tactile dome keyboard retained and sealed about its perimeter within a stainless steel casement that in turn is welded to the stainless steel walls of the base portion. The enclosure further includes a labyrinth cable seal assembly for entry of standard flexible cables without special fittings, a magnetic disk drive port having a removable circular compression seal closure, and a fluid port for circulation of coolant to an internal fluid-to-air heat exchanger for removing heat build up from the interior of the housing.

A platform disposed in the base portion of the enclosure mounts microcomputer electronic boards as well as the magnetic disk drive, and omnidirectional, shock absorbing vibration damped mounts attach the platform to a bottom wall of the stainless steel enclosure. More particularly, the mounting is by a plurality of spaced mounting posts that are anchored to the bottom wall of the base portion of the enclosure. The electronics platform has rails formed with openings that slip over the mounting posts. The platform rails are held captive on each post by lower and upper suspension coil springs, and adjustable retention collars, again one for each post, adjustably compress, in steps, the springs. A dampening pad is sandwiched between the platform and the bottom wall of the enclosure adjacent each post to dampen vibration and absorb shock.

The upper portion of the stainless steel enclosure receives the CRT assembly including the CRT monitor itself and a CRT mounting frame. The CRT frame includes a frame base having a first pair of mounting pins that project horizontally from opposite sides near the rear of the frame base and a second pair of mounting pins near the front of the frame that project forwardly of the base. Registering first and second pairs of pin capture and support assemblies are anchored to the interior wall surfaces of the enclosure and fore/aft extending rails also anchored to the enclosure walls contact and guide the rear set of CRT frame mounting pins during installation and removal. The CRT assembly, including frame, can thus be installed through a window area of the upper hood enclosure by an inward insertion and downward pivoting motion by which the rear pair of mounting pins are guided on side rails into capture brackets at the rear of the rails. Then the CRT frame assembly is pivoted down in front to drop the forward projecting pins into a pair of forward pin capture and support assemblies where the CRT frame and assembly is secured by toggle latches. The enclosure is completed by a tough transparent CRT window being placed over the front opening of the hood enclosure in registration with the CRT display and secured and sealed about the perimeter of the window in a stainless steel window casement that has been previously welded to the stainless steel walls of the enclosure.

In a preferred embodiment, the shock/vibration mounting of the CPU platform includes adjustable retention collars that enable the upper and lower coil springs to be variably and independently loaded on each post so as to detune the assembly relative to dominant natural vibration frequencies.

Adjacent the rear of the lower portion of the stainless steel enclosure, a box-like structure protrudes from the enclosure housing and accommodates a sealing labyrinth comprising a plurality of elastomeric wafers arranged in a stack within the box-like structure and having die cut graduated size, punch out holes formed therein. During set up, flexible cables are matched to the punch out holes of the wafers. Selected punch out holes are matched to fit snugly around the diameter of one or more flexible cables that extend into the microcomputer enclosure through the sealing labyrinth and then the wafers are assembled in a stack along with releasable means for compressing the stack of wafers. When compressed in the box-like structure, the elastomeric wafers form a water-tight seal at the point of cable entry.

In a preferred embodiment, one of the sealing wafers is also electrically conductive so as to form an electrically conductive shield across the opening of the conductive stainless steel box-like structure to suppress EMI emissions.

Adjacent the rear of the upper portion of the enclosure, an access plate held in sealed contact with a stainless steel casement provides both a mounting plate for an interior heat exchanger and also accommodates fluid flow to and from the heat exchanger through coolant circulation ports in the access plate. These and further features, objects and advantages of the invention will become apparent to those skilled in the art from the following detailed description and dependent drawings.

BRIEF DESCRIPTION OF THE DRAWINGS

These and further features, objects and advantages of this invention will become apparent to those skilled in the arts in the following detailed description and appended drawings which are briefly described as follows.

DETAILED DESCRIPTION OF THE PREFERRED EMBODIMENT

Figure 1:
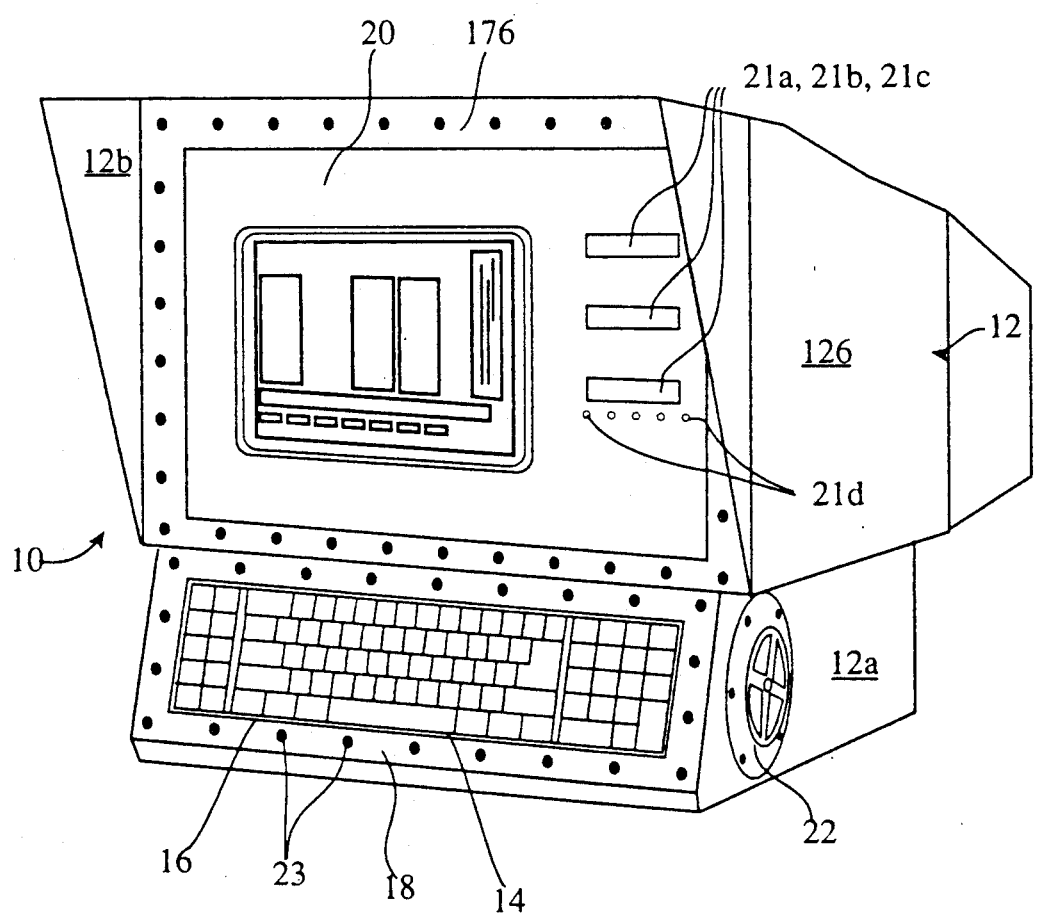
FIG. 1 is a perspective view of the environment protected industrial microcomputer constructed in accordance with the invention.

With reference to FIG. 1, industrial microcomputer 10 in accordance with the preferred embodiment is housed in an environmentally sealed stainless steel enclosure 12, including a lower or base portion 12a for the CPU and associated electronics, magnetic disc drive, stainless steel tactile keyboard, input/output cable fittings, and an upper or hood enclosure portion 12b that covers the CRT display, including a CRT support frame, as well optimal auxiliary solid state displays, as well as a heat exchanger coupled through the enclosure wall to an external coolant source. By virtue of a number of innovative structural features, industrial microcomputer 10 is waterproof, impermeable to most all corrosives, capable of withstanding severe temperature swings, for example, −50° to 120° F., and shock and vibration resistant.

Features such as the sealed stainless steel tactile keyboard 14 sealed by gasket 16 and bezel 18 in a machined pocket of a casement 15 (FIG. 5) which in turn is provided by a stainless steel investment casing welded to enclosure 12a result in a waterproof, corrosion resistant construction that also suppresses electromagnetic interference (EMI) by containment within the metal wall enclosure 12 and stainless steel keyboard 14. A display window 20 is made of a rugged, transparent synthetic material such as sold under the brand name "Lexan" to protect the relatively fragile CRT screen. A floppy disk or other magnetic storage drive is accessible through a twist-to-seal circular closure assembly 22 on the near side of the base enclosure 12a as illustrated in FIG. 1.

Base portion 12a is of a regular polygon shape, typical of microcomputer enclosures and the upper enclosure portion 12b sits atop the base portion, and has slightly greater width and depth relative thereto and several times the height to accommodate the CRT display.

Figure 2:
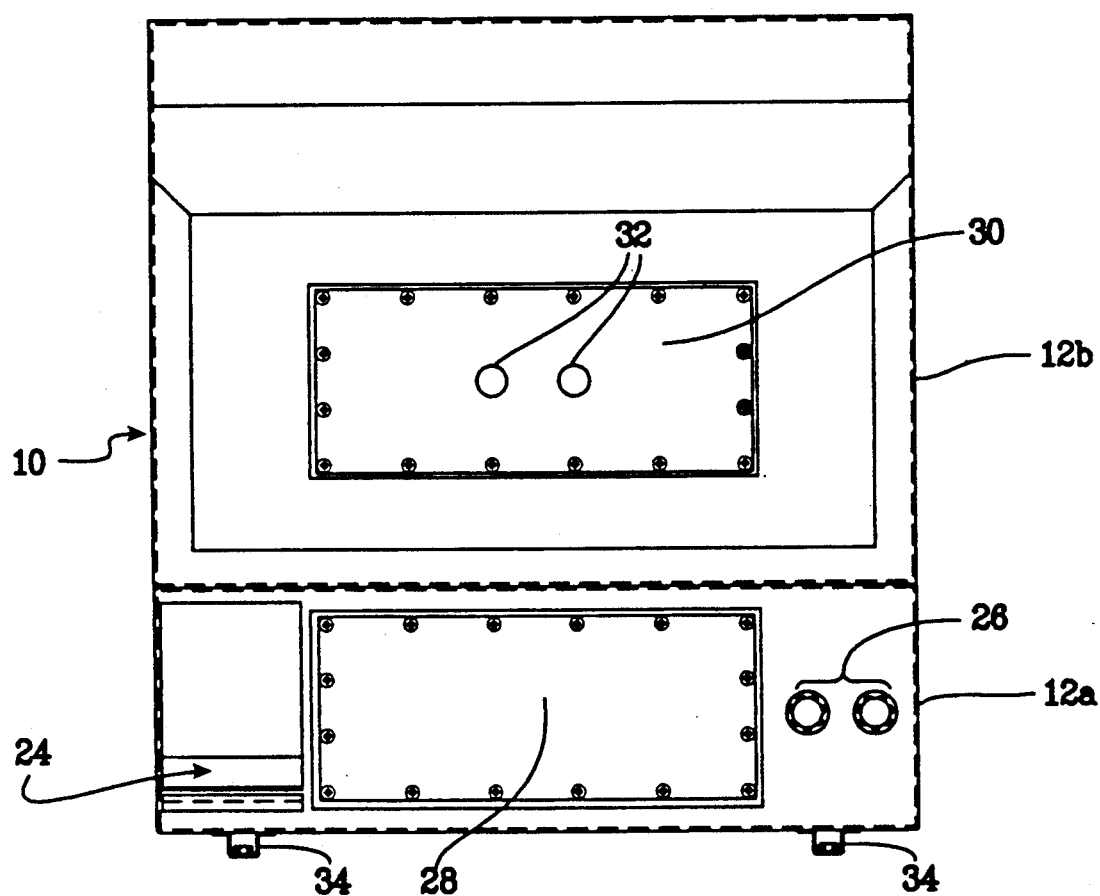
FIG. 2 is a rear elevation view of the microcomputer shown in FIG. 1.
Figure 9:
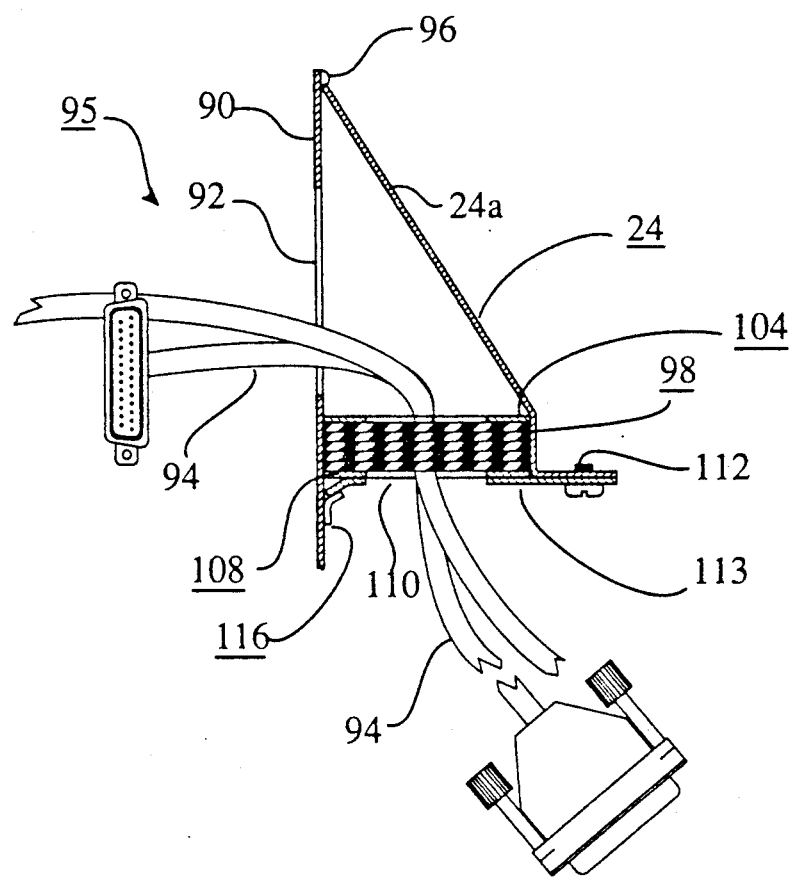
FIG. 9 is a detailed view in vertical section showing a flexible cable entry port at the rear of the microcomputer housing featuring a labyrinth seal in a box-like structure that projects from the rear wall of the lower enclosure portion.

At the rear of microcomputer 10 shown in FIG. 2, the base enclosure portion 12a has a flexible cable entry port 24 in which a box-like appendage contains a labyrinth seal formed by a stack of elastomeric sealing wafers (FIG. 9). As explained in more detail in connection with FIG. 9, these sealing wafers surround and crowd against the outer diameter of the cables at their entry point to form a tight fluid seal and yet accommodate standard, preassembled cables. Conventional hardwall conduit ports and fittings are also provided as indicated at 26 for accepting other wiring, including a power cable. A centrally located rectangular access plate 28 is snugly received within a machined pocket of a stainless steel casement (FIG. 12) in a manner similar to the keyboard mounting. The removable plate 28 is held in tight metal-to-metal contact against the casement and sealed by a perimeter O-ring as described in greater detail below in connection with FIG. 12. A similar access plate (30) with corresponding mounting and sealing is provided at the rear center of the upper portion 12b of the enclosure. Additionally, the upper housing access plate 30 serves also to mount a fluid-to-air heat exchanger shown in FIG. 15, wherein cooling fluid is conducted to and from the heat exchanger through standard fittings 32 that are accessible at the rear face of panel 30. Support feet 34 (FIG. 2) on the bottom of base enclosure portion 12a are provided with suitable fasteners for anchoring the microcomputer 10 to a work site.

Figure 3:
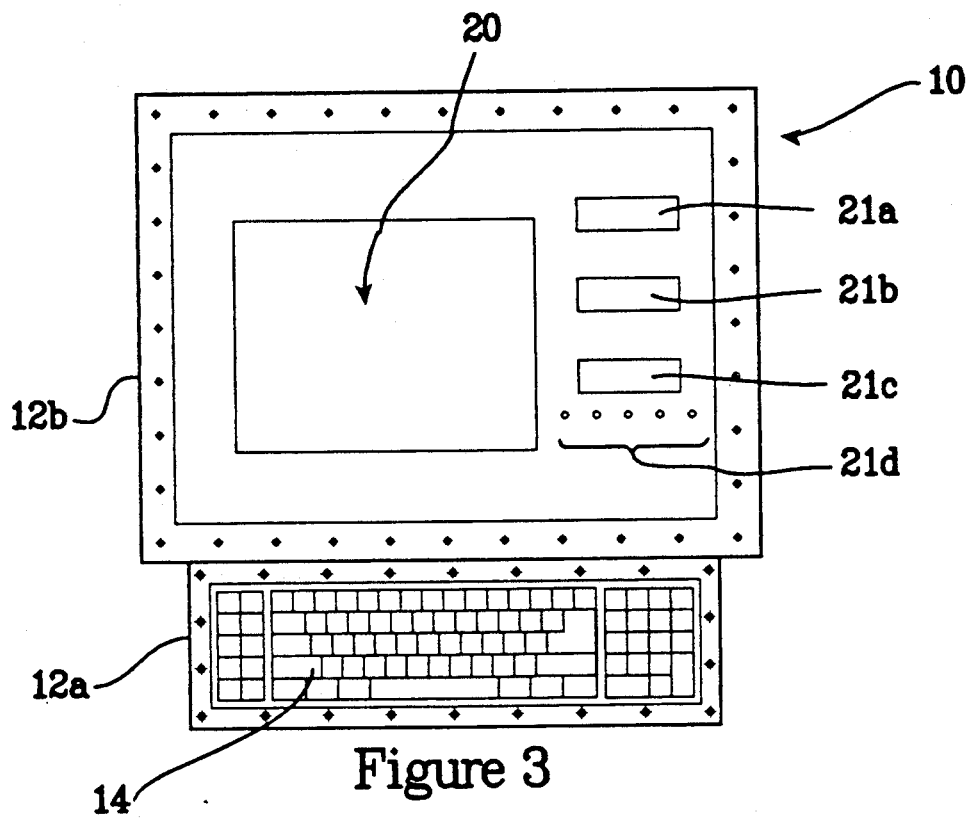
FIG. 3 is a front elevation view of the microcomputer shown in reduced size.
Figure 4:
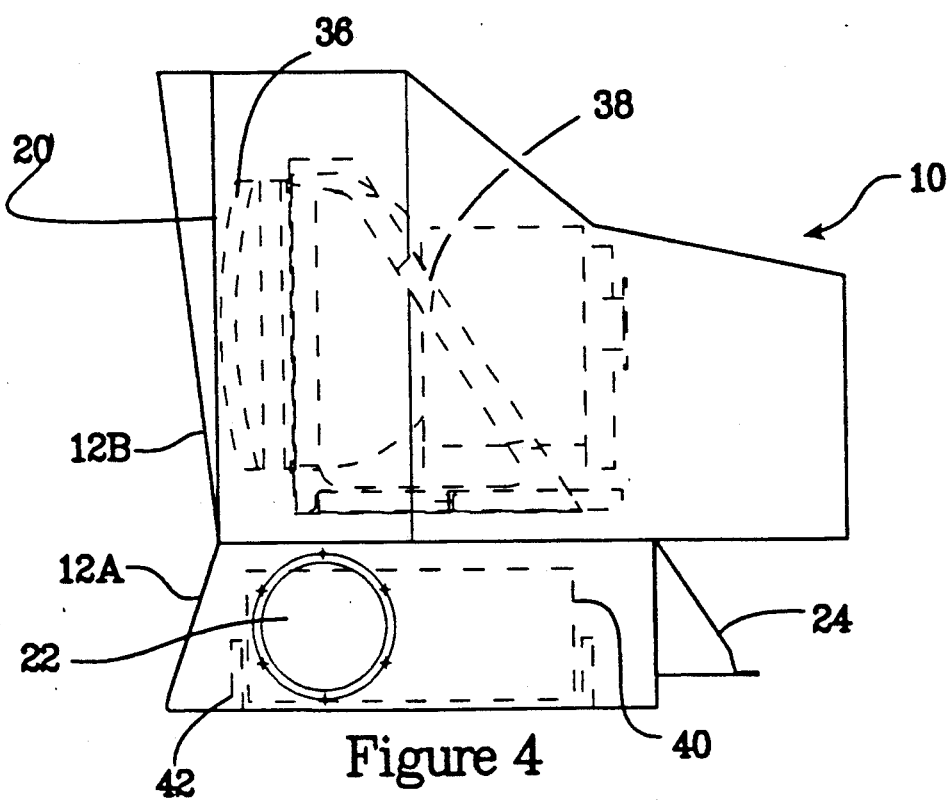
FIG. 4 is a side elevation view of the microcomputer, also in reduced size, showing the internal mounting of the CRT monitor and CPU components by dotted lines.

As shown in FIG. 4, within the upper portion 12b of the enclosure, a cathode ray tube (CRT) 36 is supported in a frame 38 and is electronically driven by the CPU and associated electronics housed in the base enclosure portion 12a. The display may include, in addition to CRT 36, one or more auxiliary, smaller displays, illustrated in FIGS. 1 and 3, as auxiliary displays 21a, 21b and 21c and other illuminated indicators shown at 21d. The auxiliary displays 21a–21c, when provided, may be suitable LCD or other solid state devices that are known per se and these may be mounted to frame 38 against the screen of CRT 36. CRT 36 and auxiliary displays 21a–21d are mounted behind the protection of window 20. Other details concerning the CRT display, auxiliary solid state displays, and the mounting thereof behind the transparent window 20 in the upper hood portion 12b of enclosure 12 are all described in greater detail herein in connection with FIGS. 14–20.

Also shown in FIG. 4 by dotted lines is the CPU and associated electronics carried by chassis 40 mounted within the base portion 12a of the enclosure 12.

Figure 5:
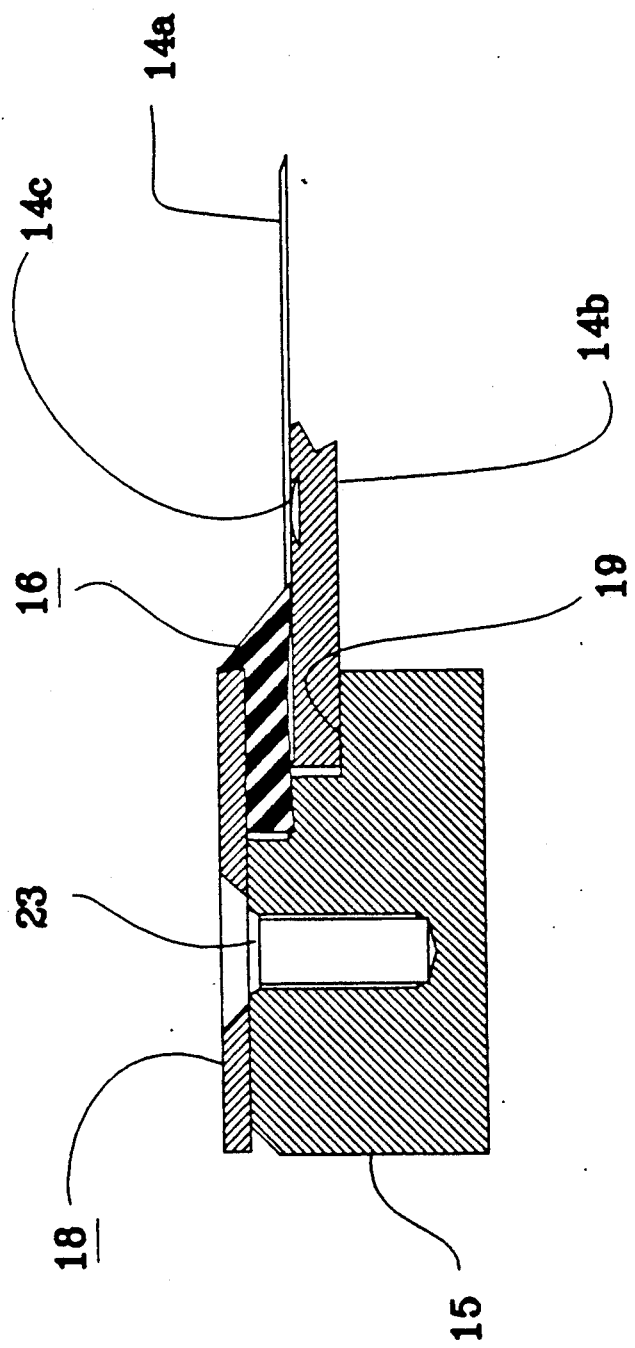
FIG. 5 is a detailed view in section of the casement, bezel, and elastomeric viewing extrusion for mounting the stainless steel tactile keyboard of the microcomputer of FIGS. 1-4.

With reference to FIGS. 1, 3 and 5, the stainless steel tactile keyboard 14 is fabricated as depicted in FIG. 5 by bonding a relatively thin, 2–6 mil, stainless steel foil 14a over a substrate of a printed circuit board 14b having conventional snap action, tactile feedback dome keys 14c mounted therein. The stainless steel foil 14a is electrically connected to stainless steel casement 15. The opposite edge of casement 15 is welded about its perimeter to the stainless steel walls of the base portion 12a of the enclosure. Casement 15 is separately fabricated with machined pocket 19 in the casting. Sandwiched between an edge of bezel 18 that projects inwardly overlying pocket 19 is an elastomeric extrusion gasket 16 made of suitable synthetic material, such as sold under the brand name Santoprene. Gasket 16 has the shape of a generally rectangular cross section with a beveled edge exposed at the bezel-to-keyboard interface. Suitable fasteners 23 are placed around the perimeter of the bezel 18 as indicated in FIG. 1 to secure the bezel 18 and gasket 16 in place seated against keyboard 14 in the stainless steel casement 15.

Figure 6:
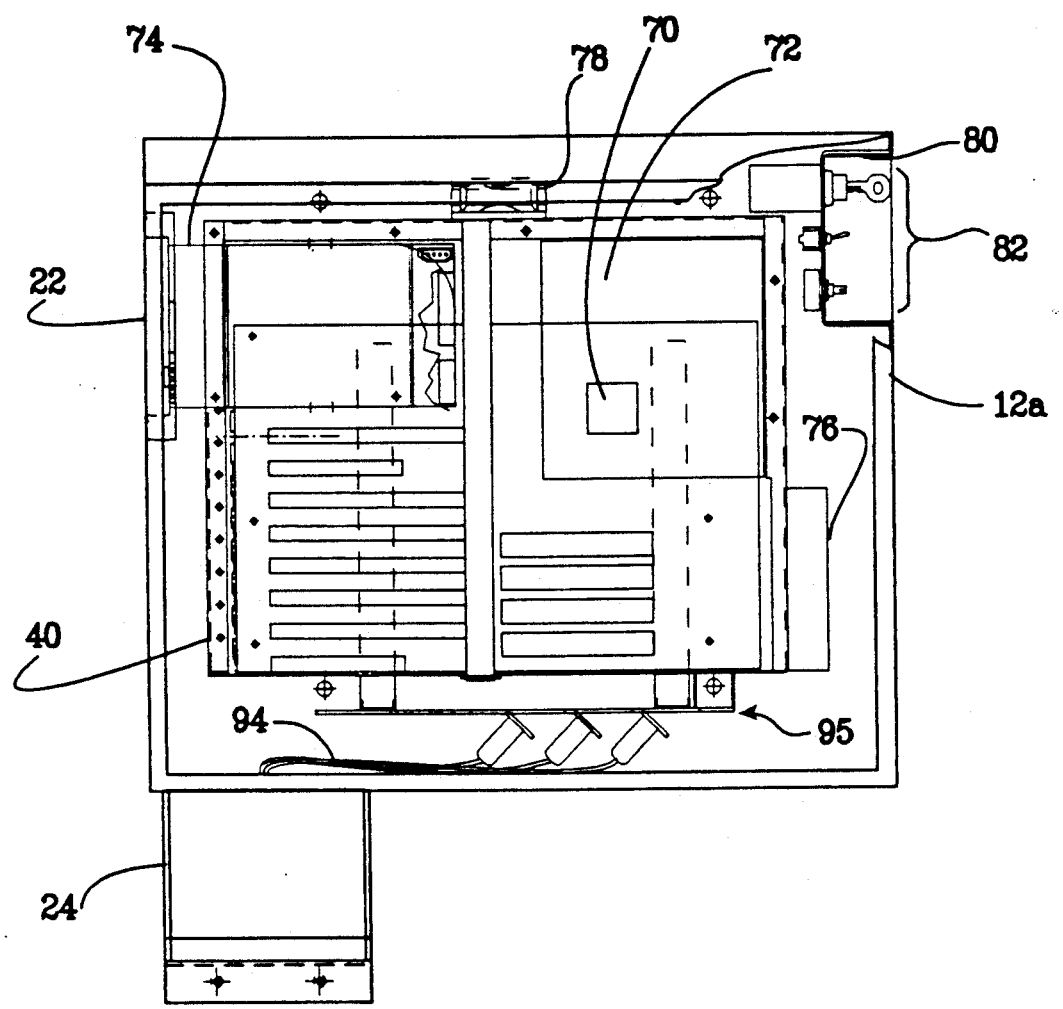
FIG. 6 is a top plan view of the lower enclosure portion of the microcomputer illustrating the platform that mounts the CPU, associated microcomputer electronics, and magnetic disk drive.
Figure 7:
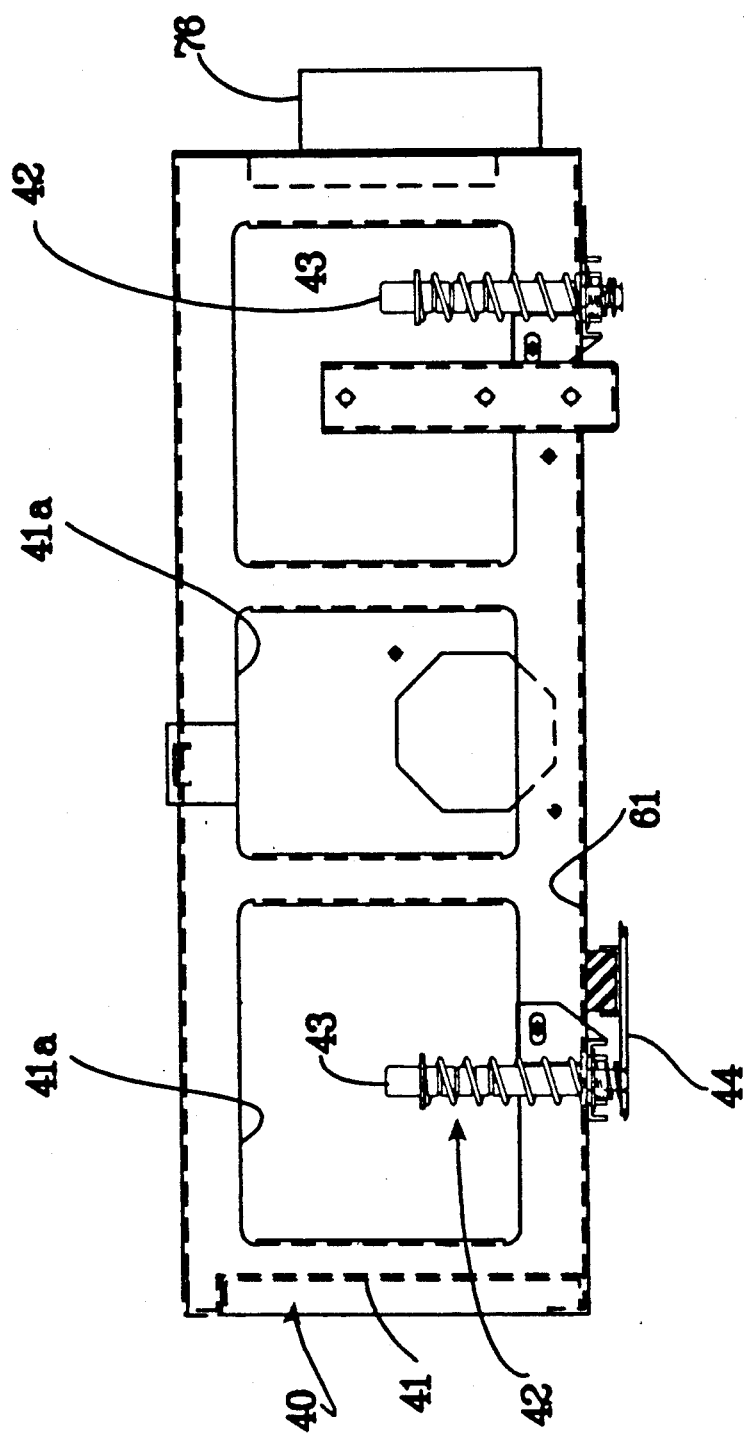
FIG. 7 is a side elevation view, partly cut away for clarity, illustrating the CPU and electronics platform mounted to the bottom wall of the lower microcomputer enclosure by spring isolation, shock absorbing mounting assemblies.
Figure 8B:
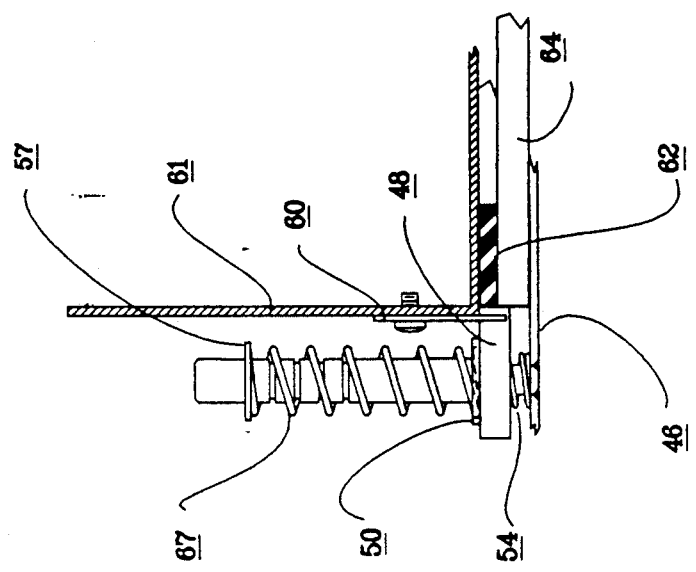
FIG. 8a, 8b and 8c illustrate various details of the omnidirectional shock-absorbing, vibration damped mounting assemblies that attach the CPU and electronics platform to the lower portion of the enclosure as shown in FIG. 7.
Figure 8A:
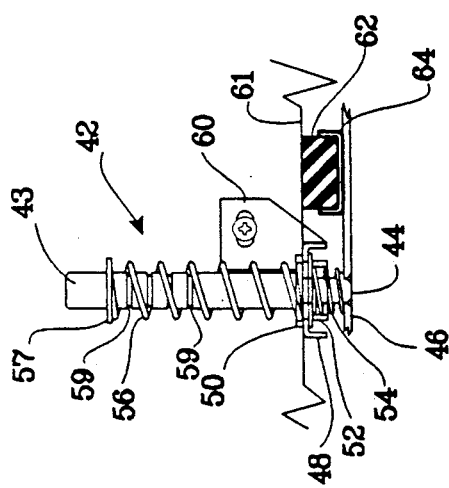

With reference to FIGS. 4, 6, and 7, electronics chassis 40 is of generally rectangular shape with dimensions sized to fit with suitable clearance inside of base enclosure portion 12a as illustrated, and is supported therewithin by omnidirectional, shock-absorbing, vibration damped mounting assemblies 42. In this case four such assemblies 42 are provided at uniformly spaced locations, although fewer or a greater number of these assemblies may be used in different embodiments. Each mounting assembly 42 includes, as best shown in FIG. 8a, a stainless steel post 43 anchored, such as by welding indicated at 44, to the bottom wall of the base enclosure portion 12a. To support chassis 40 on assemblies 42, chassis 40 includes a pair of spaced parallel channels 48, with the flanges turned down facing the bottom of the enclosure. Oversized openings 50 are provided in the web portion of channels 48, in registration with the anchored posts 43 so that the entire chassis 40 slips down over these posts at the locations of openings 50.

Between the bottom wall of the enclosure 12a and a lower annular spring guide 52, a coil compression spring 54 is slipped over the post 43 to provide a lower suspension support spring for chassis 40. Spring 54 is held coaxially on post 43 by guide 52, which in turn is concentrically affixed to channel 48 at opening 50. Above channel 48 is an upper suspension coil compression spring 56 of somewhat heavier gauge in this embodiment relative to lower suspension spring 54, and also mounted coaxially on post 43 centered by an upper annular spring guide 58. Guide 52 is coaxially affixed to channel 48 at opening 50.

Figure 8C:
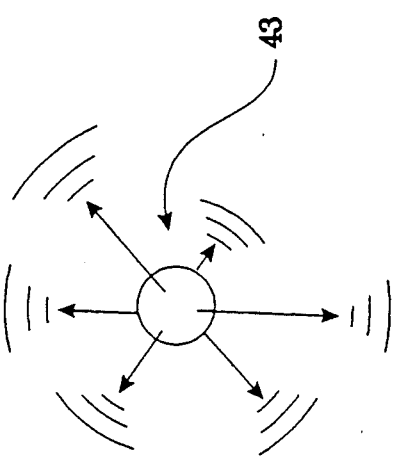

The post 43 itself is provided with a reduced diameter or necked down portion 43a at the elevation of channel 48 and extending above and below that level so as to accommodate movement of channel 48 in the horizontal plane as well as vertical movement, i.e., omnidirectional. A bracket 60 is affixed to channel 48 to secure the channel to the electronics tray 61 that is best shown in FIG. 7. A lower or bottom wall of the tray 61 of chassis 40 contacts an upper surface of a resilient dampening pad 62, such as made of rubber. Channels 6 welded to bottom wall 46, extend from the rear termination bay forwardly under chassis 40 to accommodate pads 62 at locations near posts 43. The upper extent of pad 62 projects above channel 64 and is unconfined so as to absorb vertical and horizontal vibration and shock of chassis 40 as the suspension springs 54 and 56 deform in reaction to such dynamic loads. The resulting omni-directional damped motion provided by assemblies 42 is illustrated in FIG. 8c.

Preferably, the lower suspension spring 54 is selected to have a stiffness so that the static weight of chassis 40 depresses chassis tray 61 against dampening pad 62.

Assemblies 42 are provided with an adjustable spring clip 57, such as a Klipring, at the upper end of the upper suspension spring 56 for retaining and hence loading springs 56 and 54 at different adjustable preloaded conditions by selecting one of circumferential grooves 59 provided on post 43 at axial intervals as best shown in FIG. 8a. The amount of preloading of the suspension springs by means of the adjustable spring clip 57 is dependent on the weight of the fully assembled chassis 40 as well as the selected stiffness of springs 54 and 56 and the prevalent vibration frequency to which the assembly is subjected. The adjustability of mounts 42 provided by spring clip 57 and grooves 59 permits the completed assembly to be varied at each suspension post to accommodate uneven weight distribution on the chassis and to detune the assembly relative to any natural or resonant vibration frequencies exhibited by the mechanical system as assembled. Such detuning of the natural vibration frequencies is best accomplished empirically after the microcomputer is assembled and mounted at the work site. The detuning operation also may take into account the nature and frequency of vibrations that are characteristic of the particular work site.

Figure 13:
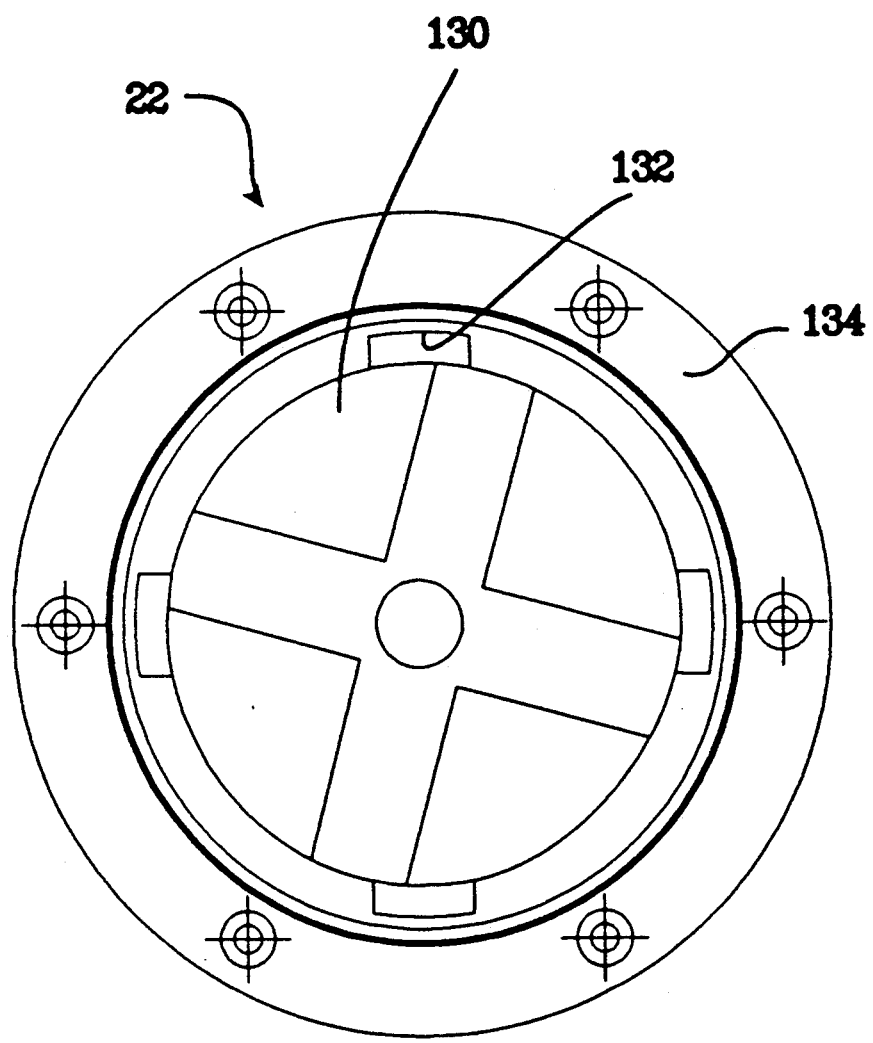
FIG. 13 is an enlarged view shown in front elevation of a circular casement and sealing door that can be opened to provide access to a floppy disk or other magnetic disk drive located on the platform shown in FIG. 6 with an opening to the side wall of the stainless steel enclosure.

With further reference to FIG. 6, chassis 40 is assembled with components of a microcomputer, known per se including, in this embodiment, a CPU 70, power supply 72, a floppy magnetic disc drive 74, MEM banks 0-3 of electronics and connection slots 1-7 for additional electronics, as illustrated. Additionally, in this embodiment, an EMI filter 76, again known per se, is mounted adjacent one side of chassis 40 as shown in FIGS. 6 and 7 for prevention of electromagnetic interference otherwise escaping the enclosure via the AC power supply line. An air circulation fan 78 mounted adjacent the front of chassis 40 behind keyboard 14 creates turbulent airflow in the entire enclosure 12 for assisting the heat exchanger, described in connection with FIG. 13, in removing heat to maintain a suitable operating temperature for the electronics components within the sealed enclosure. At a side of the enclosure base portion 12a, a recess 80 opposite drive access 22 provides a protected receptacle for various manual controls 82 including a key accessed power on/off switch, CRT monitor contrast, and the like.

Chassis 40 itself includes a horizontally disposed pan 61 and a plurality of vertically oriented, edge supported side, front and back panels 41 which are fastened to pan 61, which in turn is supported by the inverted channel rails 48 by means of attachment brackets 60. Vertical panels 41 are formed with air circulation ports 41a.

Figure 10A:
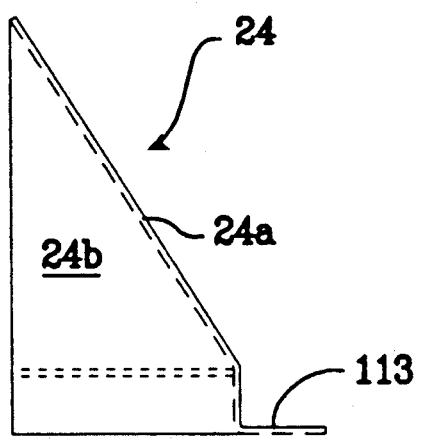
FIGS. 10a, 10b and 10c show various structural details of the box-like cable sealing structure shown assembled in FIG. 9.
Figure 10B:
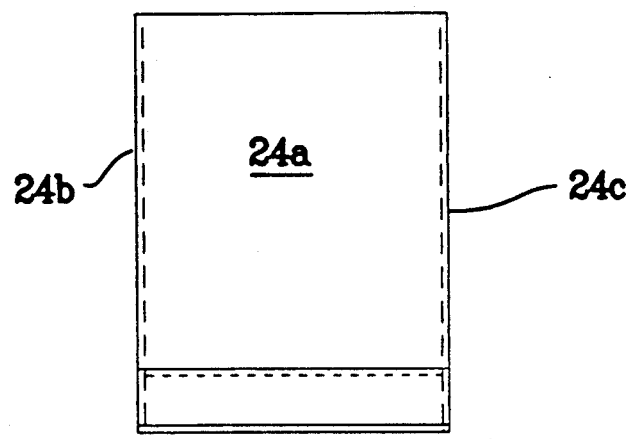
Figure 10C:
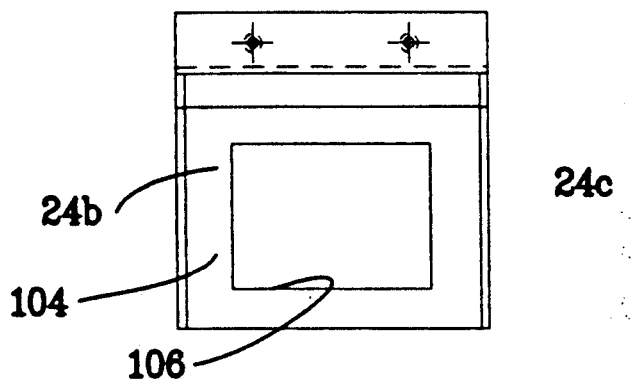

With reference to FIGS. 9-11, the cable sealing port at compression box 24 allows for entry of standard, flexible, preassembled connector terminated cabling such as used for peripheral I/O equipment, data lines, power or the like. Flexible cables having existing assembled connectors, can be routed through a labyrinth seal in box 24 without disassembly of the end connectors, achieving not only water tight sealing, but also EMI suppression using at least one conductive wafer as described hereinafter. With particular reference to FIG. 9, compression box 24 has a generally triangular shape when viewed from the side, open to the rear wall 90 of base enclosure portion 12a at which an open cable port 92 allows for free passage of one or more flexible, assembled cables 94, for extension and connection to the terminal block within a rear termination bay of the microcomputer. Box 24 has a downwardly and outwardly sloping rear wall 24a that bends to vertical at the lower extent, and side walls 24b and 24c (shown in FIG. 10b), and is open at the bottom. Box 24 is placed over the cable through port 92 at the rear wall 90 of the enclosure and seam welded at the top and sides as indicated at 96 so as to substantially surround and cover enclosure opening 92. The open bottom of compression box 24 allows the cabling to be routed therethrough up to opening 92 as shown in FIG. 9.

Figure 11B:
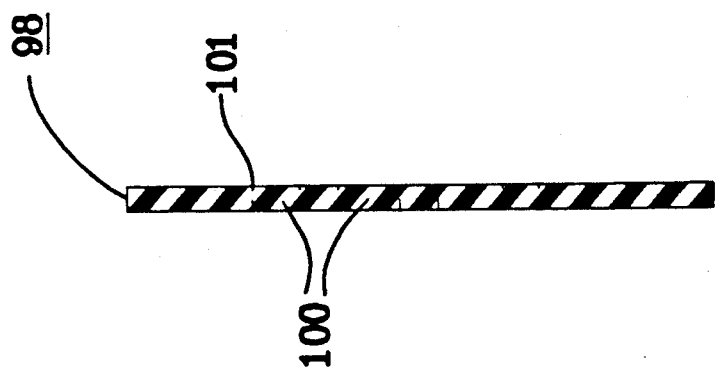
FIGS. 11a and 11b show a plan and edge view of one of the plurality of elastomeric wafers that are assembled inside the box-like structure of FIG. 9 for forming a sealing entry port for the flexible cables.
Figure 11A:
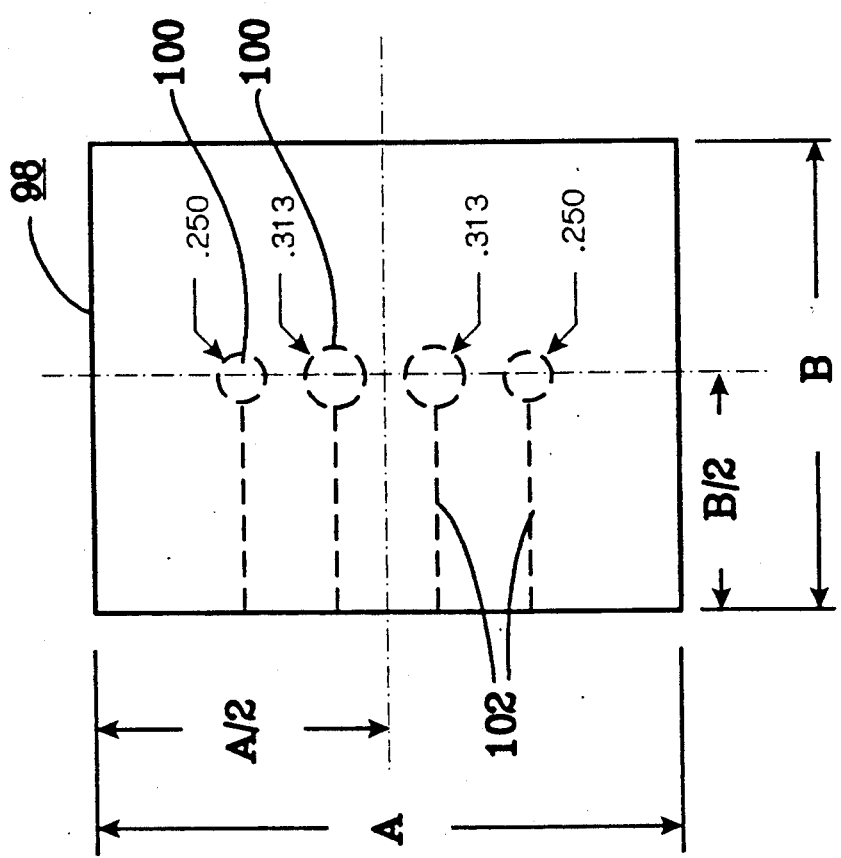

A stack of resiliently compressible wafers 98 die cut with perforations that are punched out to accommodate cables 94 form the labyrinth seal in compression box 24. An individual wafer is shown in FIGS. 11a and 11b to be of generally rectangular configuration in this embodiment cut from relatively thin stock rubber or similar material to the length and width of the inside dimensions of box 24 as shown in FIG. 9. Symmetrically placed along the center line of the wafer width dimension are a plurality of differently sized circular perforations 100 formed by non-penetrating die cut so that the holes can be punched out only as needed. Perforations 100 are arranged so that like size holes are aligned in the assembly stack and are of graded size so as to accommodate most commonly used cable diameters.

Perforations 100 are each accessed by a side slit 102 that extends to one edge of the wafer 98 as shown in FIG. 11a, with preferably all slits 102 extending to the same side so that alternating wafers of the stack as shown in FIG. 9 can be arranged with the slits 102 extending in opposite directions from the symmetrically located perforations 100 for more effective sealing when compressed in box 24.

A rigid rear stop plate 104 against which the stack is compressed is welded in place by seam welding around the perimeter of the interior of box 24 and plate 104 has a rectangular oversized opening 106 to accommodate the passage of cables including preassembled connectors 94. Similarly shaped rigid compression or compression plates 108 and 110 having oversized rectangular openings similar to opening 106 of the rear stop plate 104 are arranged as illustrated so as to press the stack of wafers 98 under the force of screw fasteners 112. The lower pressure plate 110 has its rearmost extent underlying an outwardly extending horizontal flange projecting from the back wall 24a of box 24 where fasteners 112 are placed, and is hinged by capturing a forward bent edge at 114 behind a hinge tab 116 welded to the rear wall 90 of the enclosure as depicted in FIG. 9.

The labyrinth seal in box 24 can be quickly renewed with different cables by removing pressure plates 110 and 108 and pulling out the stack of wafers 98, arranging new flexible cables 96 in place with preferably new wafers in which only the cable holes that are needed are punched out of the perforations 100 and slipped edgewise in place over the cables using slits 102 to reform a new stack. Then the preassembled reformed stack and cables are arranged in box 24 and it is closed with plates 108 and 110 and tightened with screws 112 as shown in FIG. 9. It is important that the holes outlined by perforations 100 remain intact as shown in FIG. 11b maintaining a thin membrane 101 of elastomeric material across the die cut so when the wafers are pressed in compression box 24, the seal at the unused perforations is most effective.

While preferably a stack of five such wafers, each approximately ⅛" thick have been found to provide adequate fluid sealing when subjected to hose-down conditions, a lesser or greater number of such wafers may be used although it is essential that a minimum of two separate sealing wafers be accommodated in compression box 24, preferably with the edge access slits 102 oriented in opposite directions.

In the preferred EMI suppressed microcomputer 10, one or more of wafers 98 is made with or has an electrically conductive layer so as to physically and electrically contact box 24 and enclosure wall 90 at the outer perimeter of the wafer. Electrical contact is also made at the punch out openings of the conductive wafer 98 with exposed shields on cables 94 such as an exposed braided shielded cable.

Figure 12:
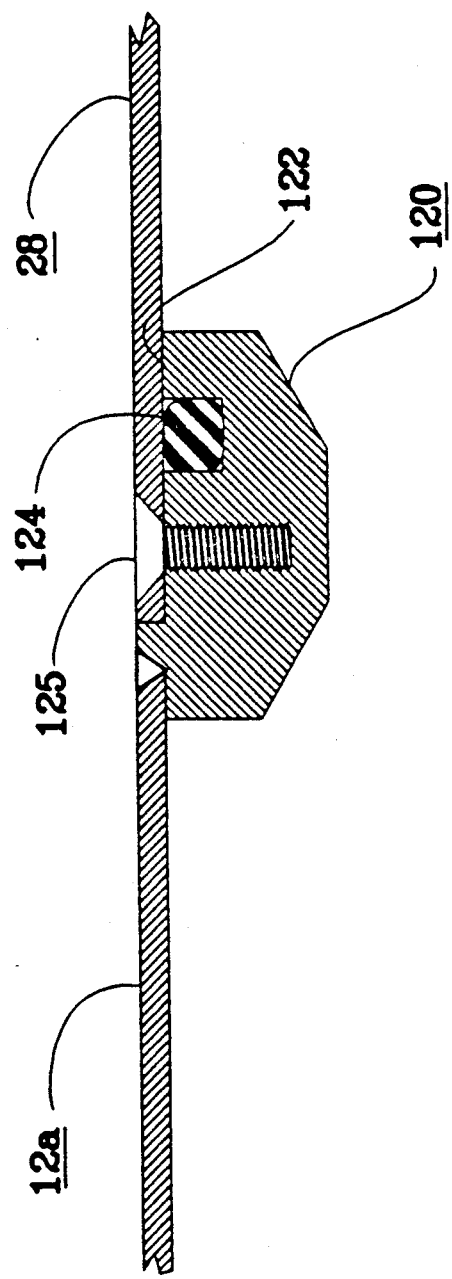
FIG. 12 is a detailed view in section illustrating the mounting of a rear axis cover plate to an investment casting of stainless steel that in turn is welded to the stainless steel enclosure wall.

Substantially centered between the compression box 24 for the flexible cabling and the hard case conduit fittings 26 at the rear of the base enclosure portion 12a, a removable access plate 28 is held against pocket 122 of casement 120 made of a stainless steel investment casting as shown in cross section in FIG. 12. Casement 120 has formed in pocket 122 an O-ring groove 124 that receives O-ring 126 that circumscribes the casement 120 and is compressed in sealing contact against the inside face of cover plate 28. The assembly is securely held in place by a plurality of screw fasteners 125. Another similar pocket 126 coplanar with pocket surface 122 receives the adjacent enclosure wall and is welded along the thusly formed seam to complete the rear access assembly. Removal of access plate 28 affords convenient access to termination bay 95, as shown in FIG. 6, for plugging/unplugging the connectors of cables 94 and other cable connections that extend to the CPU electronics on chassis 40.

The casement 120 is formed by an investment casting with machined pockets for receiving the cover plate 28. This casement 120, as well as the other casements for the window, keyboard, and heat exchanger access, is preferably of a relatively heavy, solid 316 stainless bar stock welded on the outer perimeter to the stainless steel 14 gauge walls of the enclosure so as to form a mechanically rugged construction that is not subject to warpage which might breech the O-ring and other seals. These seals and the others throughout the microcomputer enclosure meet NEMA No. 4 specifications. Also, the seals that protect the computer against water and other corrosive fluids serve to seal in any EMI emissions, thereby giving the microcomputer an overall FCC rating that is superior to Class B specifications.

Figure 14:
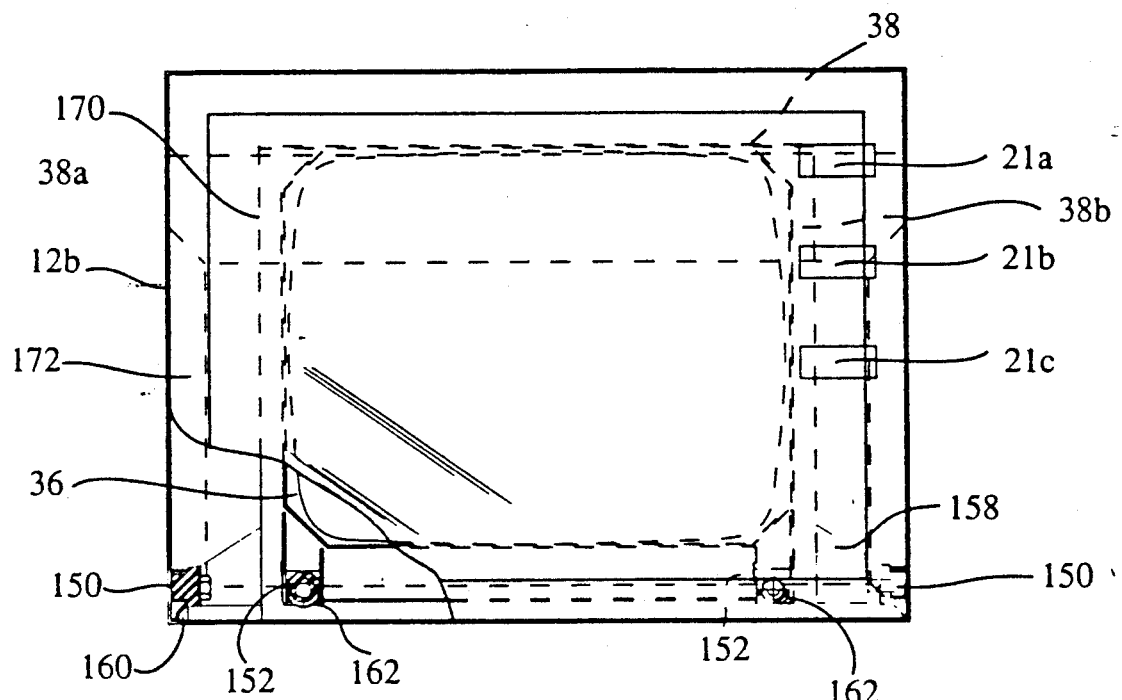
FIG. 14 is a front elevation view partly in dotted lines to illustrate the mounting and retention of the CRT display assembly in the upper hood portion of the microcomputer enclosure.
Figure 15:
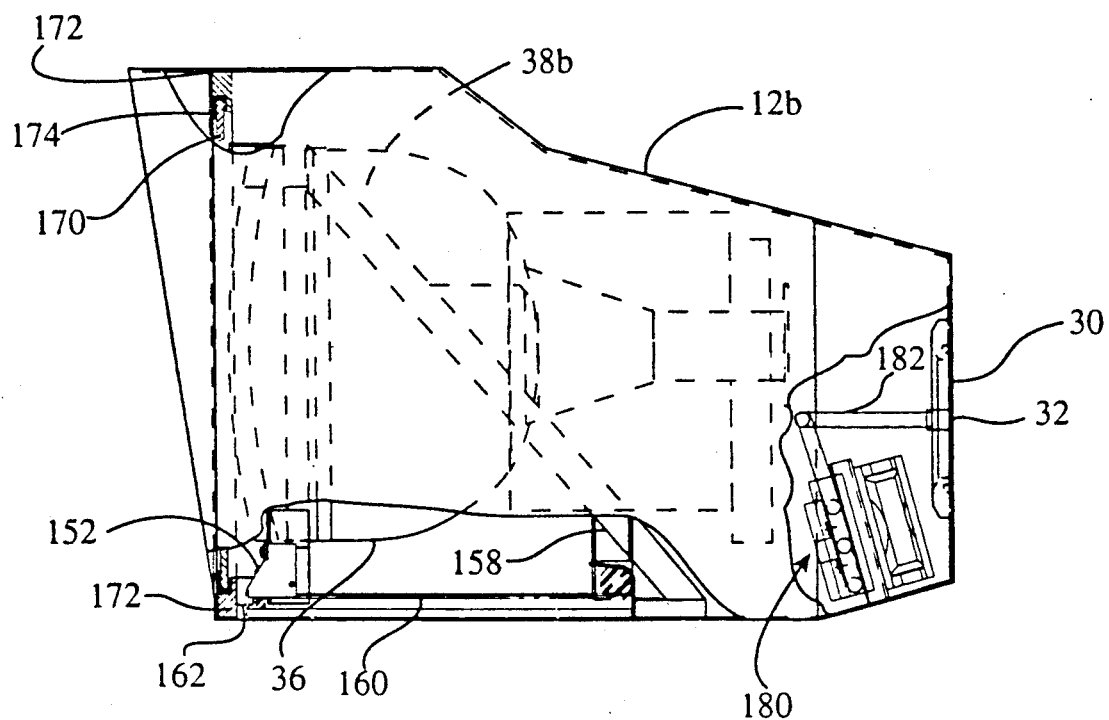
FIG. 15 is a similar view but shown in side elevation, again partly in dotted lines, illustrating the mounting of the CRT display assembly within the upper portion of the enclosure and also depicting in solid lines the interior coolant-to-air heat exchanger that is mounted in the rear interior of the upper enclosure portion.
Figure 16:
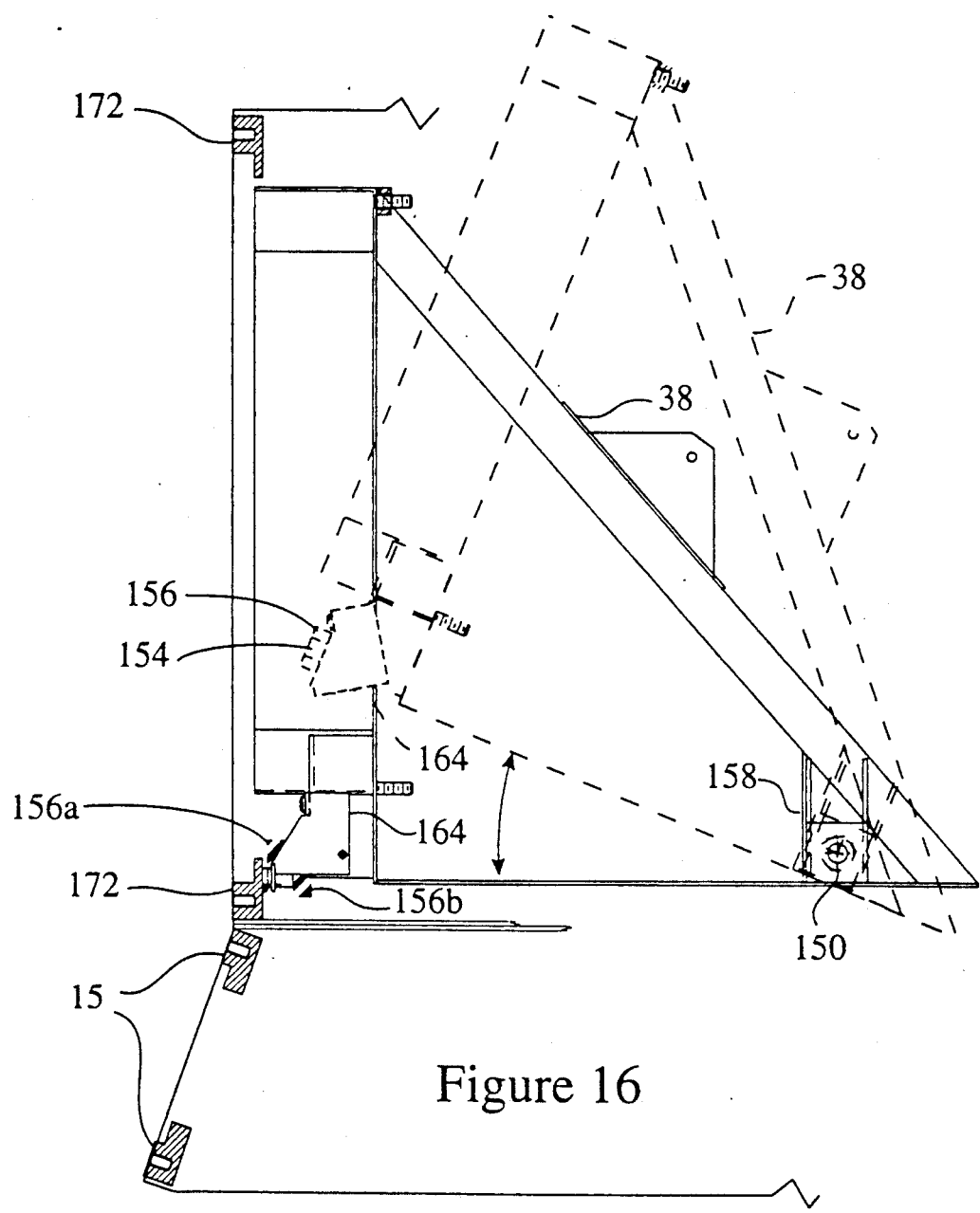
FIG. 16 is a side elevation view of the CRT frame that forms a component of the CRT display assembly of FIGS. 14 and 15, and shown in the installed position by solid lines, and in partially rotated removal/insertion position by dotted lines.

The access port to the disk drive, such as a floppy disk drive 74 as shown in FIG. 6, is by way of a removable twist to open and close, circular cover known per se in the marine industry but used uniquely here to seal off the access opening to the disc drive. The circular cover 130 and cooperating casement 134 are shown in detail in FIG. 13 with cover 130 being slightly rotated from an entry position relative to casement notches 132 which in turn is fastened to a cut out opening in the side wall of base enclosure portion 12a. The relatively large opening accommodated by the circular cover 130 accommodates the relatively wide diammetrical slot required for the entry and removal of a floppy disk and yet the quick twist-to-seal closure uniquely suits the requirement of a water tight seal at the access location to the floppy disk drive. With reference to FIGS. 14, 15 and 16, CRT frame 38 is made up of a pair of spaced parallel, triangular frame sections 38a and 38b, connected together into a rigid unit by front and rear cross members, with the sides and front structures mounting support pins covered by rubber bushings. These are indicated by a pair of side support pin assemblies 150 that project outwardly from the sides of frame 38 adjacent the rear thereof, and orthogonal thereto a pair of forward support pin assemblies 152 that project forwardly from the front lower edge of frame 38. Each of pin assemblies 150 and 152 includes a stainless steel pin anchored at one end to frame 38 and a concentric rubber bushing as indicated respectively by pin 154 and bushing 156 in the detailed FIG. 19. Bushing 156 is made from a suitable resilient material such as natural or synthetic rubber and is formed with a larger diameter portion 156b that fits against the supported frame 38 with a smaller diameter portion 156a at the extended outboard end of the pin 154.

Identical pins and bushings are provided for each of the pair of rear and forward support pin assemblies 150 and 152. The rear support pin assemblies 150 are arranged on CRT frame 38 so as to be adjacent the outermost extent of the CRT frame terminating just slightly inside the interior surfaces of the side walls of upper enclosure 12b as best shown in FIG. 14. In this embodiment, the rear support pin assemblies 150 are supported by side bracket 158 on frame 38 having downwardly and outwardly sloping flange portions that distribute the load carried by pin assemblies 150 up into frame 38. As described in connection with FIGS. 17 and 18 during installation of the CRT, the rear support pin assemblies 150 ride along guide rail assemblies 160 mounted on the interior side walls of upper enclosure portion 12b and assemblies 150 are captured at the rearmost extent of travel by upwardedly and forwardedly bent capture brackets fastened to the rail and enclosure side wall as part of that assembly.

Figure 19:
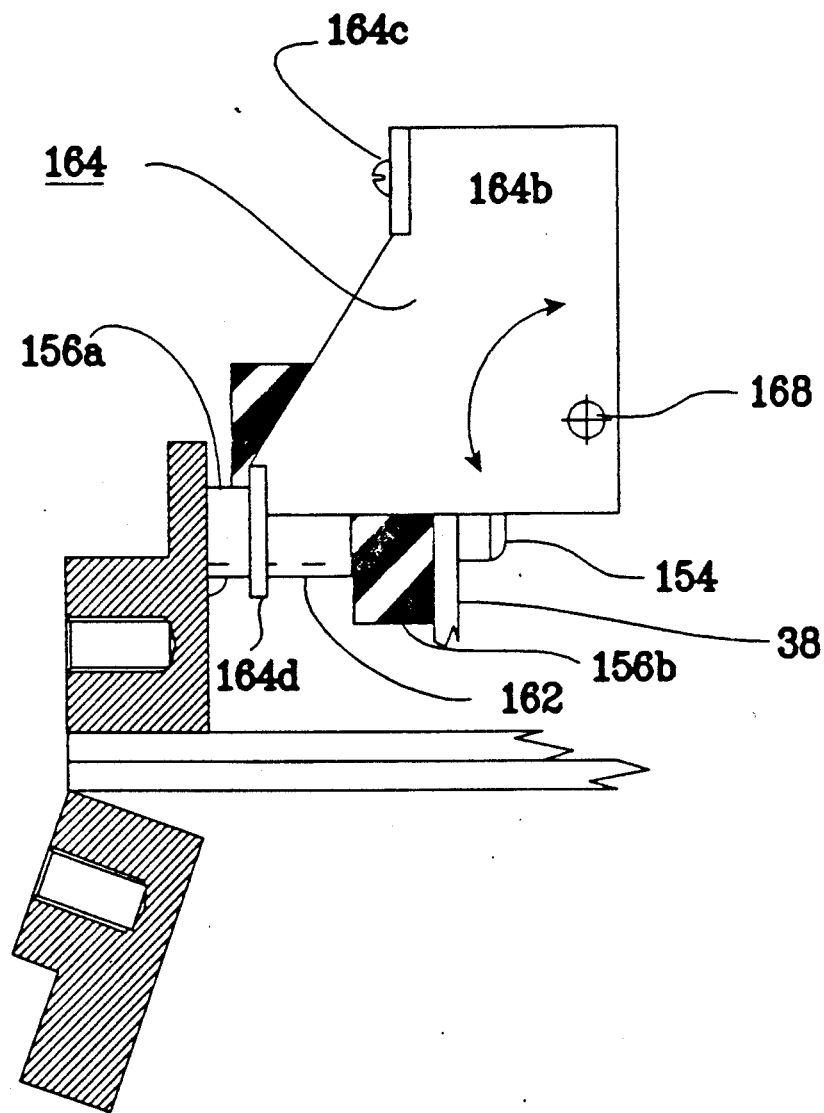
FIG. 19 is a detailed view illustrating a portion of the enclosure structure adjacent the front of the microcomputer including a seat for receiving and a toggle clamp for clamping the forward lower mounting pins of the CRT display assembly within the microcomputer enclosure.

The front support pin assemblies 152 drop into and are held in mating seats 162 each formed by a hollow half cylindrical wall that has been cut along the axis and the upper portion removed so as to form a semi-cylindrical seat that is welded at the forward end to the backside of the window casement as best shown in FIG. 19. Each of the pair of seats 162 project rearwardedly for a length that is substantially equal to that of the axial dimension of the smaller diameter portion 156a of rubber bushing 156.

The rear support pin assemblies 150 being at right angle to the forward support pin assemblies 152 enable the entire CRT module to be installed and anchored in place by first capturing the rear support pin assemblies 150 in the rear pin capture brackets of rail assemblies 160 and then clamping the forwardly projecting support pin assemblies 152 by toggle clamps 164 as best shown in FIGS. 16 and 19. When the CRT and its frame assembly are installed as a unit, and pin assemblies 152 rest in seats 162, the fore-aft movement of the CRT and frame is restrained by the rear wall of the window encasement and by the vertical rise of the stop and capture brackets at the rear extent of rail guide assemblies 160. Vertical restraint at the rear is provided by the forwardly bent brackets 160c as shown in FIG. 18 and at the forward support pins 152, toggle clamps 164 hold the CRT assembly down against seats 162.

Figure 20:
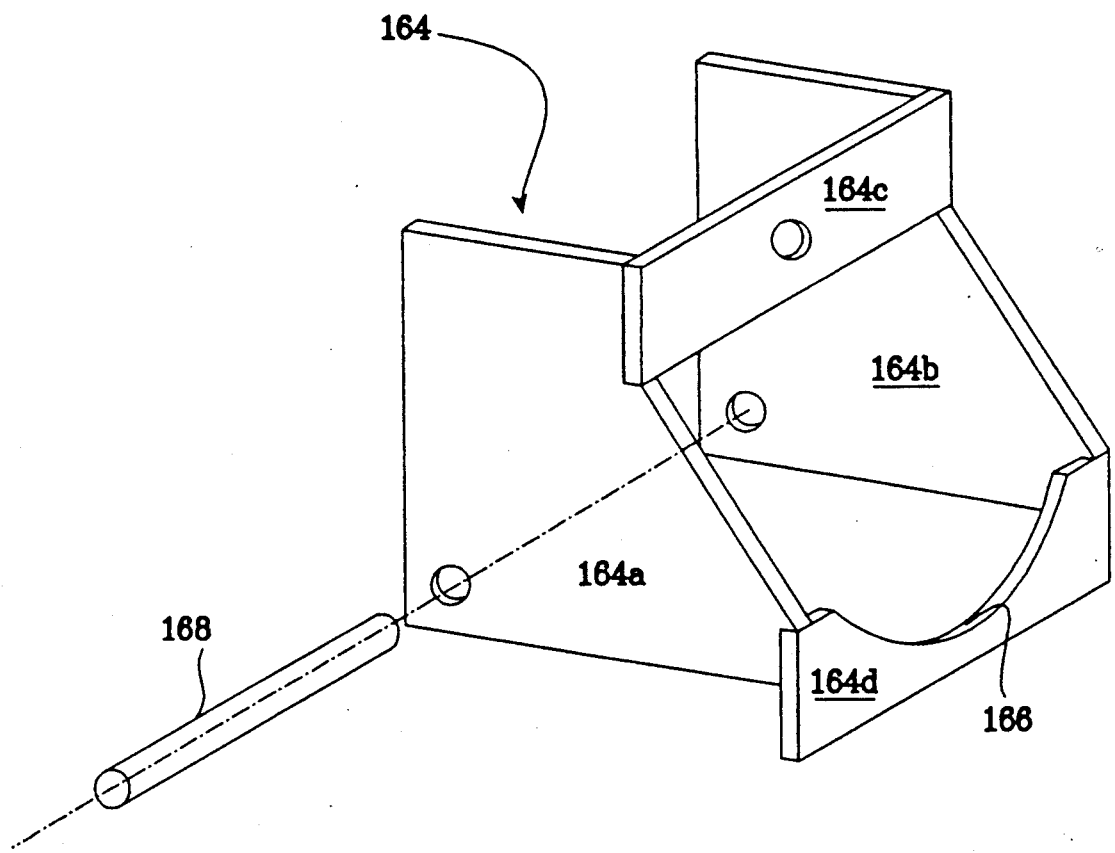
FIG. 20 is a partial exploded view of the toggle clamp shown in assembled form in FIG. 19.

More particularly, toggle clamps 164, one for each of the forward support pin assemblies 152, include, as shown in FIG. 20, a pair of spaced vertical side members 164a and 164b, an upper cross member 164c connecting sides 164a and 164b and a lower cross member 164b having a semi-circular cut out 166 that is mated to the exterior diameter of the semi-cylindrical seat 162. Toggle clamp 164 also has a pivot pin 168 that extends between side members 164a and 164b of the toggle clamp and through a support member of frame 38. By this mounting, toggle clamp 164 rotates through a partial circle of about 45° between an unclamped position in which the lower cross member 164b is rotated downwardly and rearwardly away from the rearwardly projecting seat 162, and a clamping position rotated upwardly and forwardly with pin assemblies 152 resting on seats 162. Cutout 166 presses up against the lower exterior of seat 162 and the weight of the CRT and frame holds the toggle clamp and its pivot pin 168 in place resiliently compressing rubber bushing 156 into seat 162.

Figures 17, 18:
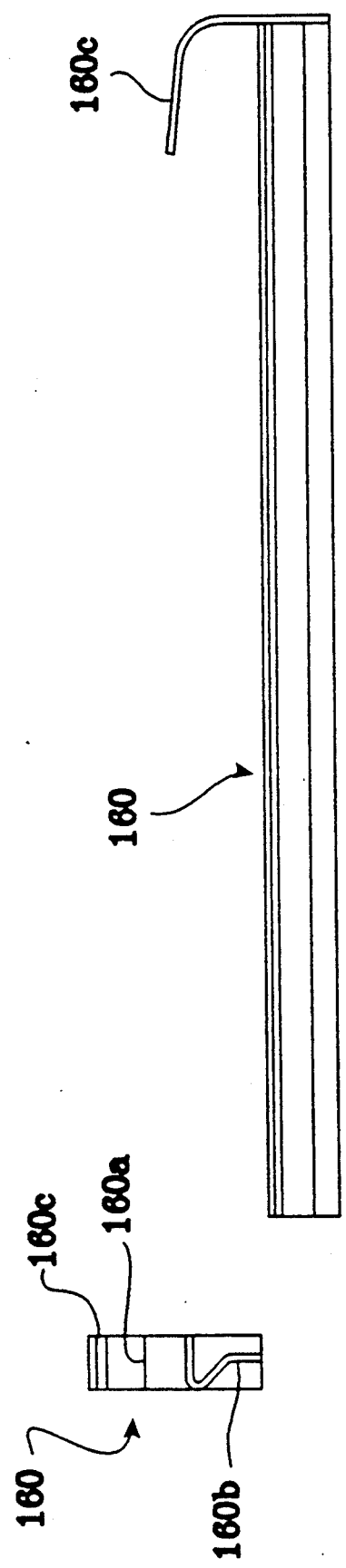
FIGS. 17 and 18 are side elevation and end views, respectively, of a guide and capture rail for the CRT display assembly, one such rail being provided for each side of the enclosure and including a mounting pin capture bracket affixed to the rear end of the guide rail.

Each of rail assemblies 160, as shown in FIGS. 17 and 18, comprise a horizontally elongated rail having a cross section made by transverse bends in a web of stainless steel material into an upper horizontal rail portion 160a on which the rear support pins and bushings ride, and a lower stem portion 160b that returns inwardly and then downwardly forming a vertical support flange that is welded to the upper enclosure 12a. Also, the rail is welded at the bend forming the rail portion 160a to the side wall of the enclosure so as to provide additional securement. At the rear of the rail portion 160a, an upwardly extending and then forwardly bent capture bracket 160c is welded to the end of the rail and support portions 160a and 160b so that the forward bend of portion 160c commences at a suitable height above the top of rail portion 160a to accommodate rubber bushing 156 on rear pin assembly 150. The forwardly projecting end of portion 160c raises slightly upwardly and forwardly so as to facilitate capture of the rear pin assemblies 180 causing rubber bushing 156 to compress slightly as the assembly is forced rearwardly to a stop position seated against the vertical rise of portion 160c. The rear capture bracket 160c is also welded at its outer edge to the interior wall surface of the upper enclosure portion 12b for additional strength.

To install CRT and CRT frame 38, the complete CRT assembly is inserted rear portion first into the window opening, after the transparent window 170 has been removed, tilted as shown in FIG. 16 so that the rear support pin assemblies 150 contact and ride rearwardly on rail assemblies 160 and with the forward support pin assemblies 152 raised above and clearing the lower horizontal extent of the window frame. The rearward insertion of the assembly continues with support pins and the bushings thereof sliding into capture by the rearward capture brackets 160c of assemblies 160 at which time the frame 38 can be pivoted at the front end downwardly rotating on pin assemblies 150 so that the forward pin assemblies 152 can rest on seats 162. The toggle clamps 164 are pivoted as described above to lock the assembly in place with the weight of the CRT forcing toggle clamps 164 via pins 168 so as to capture and hold the rubber bushing 156 in seated contact with seats 162.

Removal of the CRT assembly is the reverse of the foregoing sequence. First, of course, the transparent window of the display is removed and the CRT frame 38 is lifted at the front end to relieve the weight on toggle clamps 164 and the clamps are pushed to their rotated open position to allow cross members 164d to clear seat 162. The assembly is then raised enough to allow the front end of the CRT frame and the CRT itself to be pulled out of the front opening of the enclosure with the rear support pins again riding on rail assemblies 160 until the entire assembly is pulled forward enough to disconnect the CRT module connectors from the rest of the electronics located in the lower base enclosure portion 12a.

With reference to FIG. 15, the display portion of the microcomputer 10 is provided with a transparent window 170 made from a tough, high-strength transparent material such as sold under the trade name Lexan.

Window 170 is secured and sealed within stainless steel window casement 172 which in turn is welded to the interior wall surface of the upper enclosure portion 12b at the display window. An extruded elastomeric gasket 174 of generally U-shaped cross section is mounted in place fitted on to the edge of the transparent window 170 and then held in place by a stainless steel bezel fastened at spaced locations around the perimeter of the assembly. Gasket 174 is provided with a forwardly and outwardly projecting resilient sealing lip 174a to enhance the sealing effect of bezel 176 (see FIG. 1) which presses the entire gasket and window 170 against window casement 172.

Heat exchanger 180, including built-in fans, is situated at the rear of the upper enclosure 12b and is connected to and supported from the access plate 30 by conduits 182 and fittings 32 as illustrated in FIG. 15. Plate 130 is held in a casement with a perimeter O-ring seal similar to the construction and sealing of the rear access plate 28 described above. Air is circulated with turbulent flow throughout the interior of the enclosure 12, including especially the upper enclosure portion 12b which generates substantial heat due to the losses in the CRT and associated CRT power supply. Fan 78 mounted at the front of the electronics chassis 40 helps create turbulent air flow, and in this way heated air is passed into contact with heat exchanger 180 and heat is withdrawn in the circulating coolant that enters and exits the enclosure at fittings 32. The heat exchanger 180 is per se known and does not itself form a novel aspect of this invention and hence is not described in any greater detail Likewise, the CPU and associated electronics, and the CRT drive electrical components do not constitute a novel aspect of this invention and are not described in further detail.

While only a particular embodiment has been disclosed herein, it will be readily apparent to persons skilled in the art that numerous changes and modifications can be made thereto, including the use of equivalent means, devices, and method steps, without departing from the spirit of the invention as defined in the following claims.

What is claimed is:

1. An environmentally sealed, EMI suppressed, shock/vibration protected microcomputer workstation for use in extreme operating conditions including exposure to water, corrosive chemicals, mechanical shock, vibration and wide temperature variations, comprising:
   an enclosure of stainless steel walls having a base portion and a hood portion rising upward from the base portion, the base portion having a front keyboard receiving casement and the hood portion having a display window receiving casement, the enclosure further including a magnetic disk drive port, fluid ports for circulation of coolant, and conduit and flexible cable ports for electrical interconnects;
   a platform disposed in said base portion of said enclosure on which microcomputer electronic boards, magnetic disc drive and input/output connectors are mounted so as to all be contained within said base portion;
   omnidirectional, shock-absorbing, vibration damped mounting means attaching said platform to a bottom wall of said base portion of said enclosure, said mounting means including:
      a plurality of platform mounting posts disposed at spaced locations in said enclosure base portion, the lower ends of which are anchored to a bottom wall of said enclosure base portion;
      lower coil suspension springs, one for each post, coaxially positioned on said posts; at least first and second rails having post receiving openings therein sized to slip over said vertical posts and suspended above the bottom wall of said base portion by said lower coil springs;
      upper coil suspension springs, one for each post, coaxially positioned on said plurality of posts above said rails;
      adjustable retention means, one for each of said posts, attached adjacent the upper ends of said posts for adjustably compressing said upper and lower coil springs with said rails held captive therebetween; and
      dampening means proximate said vertical posts for dampening suspension spring reaction to shock and vibration of said rails and hence said platform relative to said enclosure;
   a CRT and CRT frame therefor having a base on which a first pair of CRT mounting pins horizontally project from opposite sides and adjacent the rear of said CRT frame base, and a second pair of CRT mounting pins project horizontally and forwardly, orthogonal to said first pair of pins and arranged adjacent the front of said CRT frame base;
   first and second pairs of pin capture and support means mounted on internal wall surfaces of said enclosure in registration with said first and second pairs of CRT mounting pins, respectively, such that said CRT and CRT frame install in said hood portion of said enclosure as a unit by an inward insertion and downward pivoting about said first pair of CRT mounting pins captured in said first pair of pin capture and support means said second pair of CRT mounting pins dropping into said second pair of pin capture and support means so as to secure said CRT and CRT frame within said enclosure;
   a transparent CRT window secured and sealed about its perimeter in said window casement of said hood portion of said enclosure; and
   a tactile feedback keyboard mounted and sealed in said keyboard receiving casement at the front of said base portion of said enclosure and internal electrical cabling connecting said keyboard to said electronic boards mounted on said platform.

2. The environmentally sealed, EMI suppressed, shock/vibration protected microcomputer workstation of claim 1, wherein said adjustable retention means comprise means for variably loading said upper and lower coil springs on each vertical post so as to detune the natural vibration frequencies of said platform within said enclosure to adapt the workstation to different shock/vibration environments.

3. The environmentally sealed, EMI suppressed, shock/vibration protected microcomputer workstation of claim 1, wherein at least one of said mounting posts is formed with a plurality of axially spaced circumferential grooves, and said retention means for such mounting post comprises means cooperating with said grooves for securing said retention means at different vertical positions on said vertical stud to vary the loading of said upper and lower coil springs.

4. The environmentally sealed, EMI suppressed, shock/vibration protected microcomputer workstation of claim 3, wherein at least one of said mounting posts is formed with a necked-down portion substantially in registration with the nominal position of the cooperating one of said platform rails, in which the diameter of said necked-down portion is substantially smaller than the interior diameter of the opening in the cooperating platform rail in order to accommodate omnidirectional movement of the rail and hence platform relative to the mounting post while the axially adjacent non-necked-down portions of such mounting post assist in centering the upper and lower coil suspension springs.

5. The environmentally sealed EMI suppressed, shock/vibration protected microcomputer workstation of claim 1, wherein said dampening means comprises at least one body of elastomeric material affixed between one of said rails and said bottom wall of said enclosure adjacent at least one of said mounting posts.

6. The environmentally sealed, EMI suppressed, shock/vibration protected microcomputer workstation of claim 1, wherein said flexible cable port of said enclosure is a reuseable sealed cable entrance that accommodates standard flexible cabling and comprises:
   a box structure of stainless steel material generally surrounding a cable traversing opening in a wall of said enclosure;
   a plurality of wafers of elastomeric material arranged in a stack within said box structure and having registering holes formed therein, matched so as to fit snugly around the diameter of a cable that extends into the enclosure through the cable port; and
   releasable means for compressing the stack of wafers so that the elastomeric material at the edges of said holes therein are pressed into sealing engagement with the exterior of the cable and the elastomeric material at the perimeters of each of said wafers are pressed into sealing engagement with the interior wall surfaces of the box structure that generally surrounds said enclosure port.

7. The environmentally sealed, EMI suppressed, shock/vibration protected microcomputer workstation of claim 6, wherein said elastomeric wafers are each die cut to form punch out hole perforations of graded size, and said punch out hole perforations are aligned by size in said stack such that like size holes that have been punched out form a cable engaging and sealing passage that is selectively mated to the outside diameter of a correspondingly sized cable while the retained material of the remaining punch out hole perforations form a blocking seal.

8. The environmentally sealed, EMI suppressed, shock/vibration protected microcomputer workstation of claim 7, wherein said wafers of elastomeric material in said stack are compressed between an inner fixed backing member disposed within said box structure adjacent the cable opening into the enclosure, and an outer rigid removeable plate that is releasably fastened to said box structure forming a closure therefor, said removeable plate having a cutout through which a cable passes.

9. The environmentally sealed, EMI suppressed, shock/vibration protected microcomputer workstation of claim 8, wherein at least one of said wafers is an electrically conductive elastomer forming in said stack of wafers an electrically conductive shield.

10. The environmentally sealed, EMI suppressed, shock/vibration protected microcomputer workstation of claim 1, wherein said first pair of pin capture and support means comprise a pair of rails extending substantially horizontally along the interior side walls of said enclosure and a pair of forwardly bent pin capture brackets, one for each rail, disposed adjacent the rear extents of said rails and in registration with said first pair of laterally opposed horizontally projecting CRT mounting pins on said CRT frame base such that during installation said first pair of CRT frame mounting pins ride on said rails during rearward insertion of said CRT and CRT frame until captured and held against vertical displacement by said forwardly bent pin capture brackets.

11. The environmentally sealed, EMI suppressed, shock/vibration protected microcomputer workstation of claim 10, wherein said second pair of pin capture and support means comprise pin receiving semi-cylindrical seats that are axially aligned with the installed positions of said second pair of CRT frame pins respectively and are open upwardly so that said second pair of pins drop down into said semi-cylindrical seats; and
toggle clamp means, rotatably mounted on said CRT frame adjacent said second set of CRT mounting pins for rotation from a released position when said second set of pins are lifted upwardly off of said semi-cylindrical seats to a latched position in which said toggle clamps include means extending beneath said seats to catch thereon and hold said second set of pins on said seats captive against vertical displacement.

12. The environmentally sealed, EMI suppressed, shock/vibration protected microcomputer workstation of claim 1, further comprising annular elastomeric shock/vibration absorbing bushings mounted on said first and second pairs of CRT mounting pins.

13. The environmentally sealed, EMI suppressed, shock/vibration protected microcomputer workstation of claim 7, wherein said die cut punch out hole perforations each have an associated die cut slit extending from an outer edge of the associated one of said wafers to an edge of said punch out hole perforations such that said slits in said wafers separate so as to be slipped individually around the circumference of a cable to center the cable in one of the holes formed by said punch out hole perforations.

14. The environmentally sealed, EMI suppressed, shock/vibration protected microcomputer workstation of claim 1, wherein said enclosure further comprises:
an access plate and an access plate receiving casement, both of stainless steel, disposed in a wall of said enclosure;
a circulating coolant heat exchanger supportively mounted on said access plate facing into said enclosure and having fluid passages communicating with fluid ports provided in said access plate and said ports being adapted adjacent an exterior surface of said access plate for connection to source of coolant.

15. The microcomputer workstation of claim 14, wherein said access plate receiving casement is a stainless steel investment casting.

16. The microcomputer workstation of claim 15, wherein said casement investment casting is welded about its perimeter to said stainless steel enclosure.

17. The microcomputer workstation of claim 16, wherein said casement investment casting is formed with an O-ring seal receiving groove in a pocket that receives said access plate.

18. An environmentally sealed, EMI suppressed, shock/vibration protected microcomputer workstation for use in extreme operating conditions including exposure to water, corrosive chemicals, mechanical shock, vibration and wide temperature variations, comprising:
an enclosure of stainless steel walls having a base portion and a hood portion rising upward from the base portion, the base portion having a front keyboard receiving casement and the hood portion having a display window receiving casement, the enclosure further including a magnetic disk drive port, fluid ports for circulation of coolant, and conduit and flexible cable ports for electrical interconnects;
a platform disposed in said base portion of said enclosure on which microcomputer electronic boards, magnetic disc drive and input/output connectors are mounted so as to all be contained within said base portion;
omnidirectional, shock-absorbing, vibration damped mounting means attaching said platform to a bottom wall of said base portion of said enclosure, said mounting means including:
a plurality of platform mounting posts disposed at spaced locations in said enclosure base portion, the lower ends of which are anchored to a bottom wall of said enclosure base portion;
lower coil suspension springs, one for each post, coaxially positioned on said posts;
at least first and second rails having post receiving openings therein sized to slip over said vertical posts and suspended above the bottom wall of said base portion by said lower coil springs;
upper coil suspension springs, one for each post, coaxially positioned on said plurality of posts above said rails;
adjustable retention means, one for each of said posts, attached adjacent the upper ends of said posts for adjustably compressing said upper and lower coil springs with said rails held captive therebetween; and dampening means proximate said vertical posts for dampening suspension spring reaction to shock and vibration of said rails and hence said platform relative to said enclosure.

19. The environmentally sealed, EMI suppressed, shock/vibration protected microcomputer workstation of claim 1, wherein said adjustable retention means comprise means for variably loading said upper and lower coil springs on each vertical post so as to detune the natural vibration of said omnidirectional, shock-absorbing, vibration dampened mounting means.

20. An environmentally sealed, EMI suppressed, shock/vibration protected microcomputer workstation for use in extreme operating conditions including exposure to water, corrosive chemicals, mechanical shock, vibration and wide temperature variations, comprising:

an enclosure of stainless steel walls having a base portion and a hood portion rising upward from the base portion, the base portion having a front keyboard receiving casement and the hood portion having a display window receiving casement, the enclosure further including a magnetic disk drive port, fluid ports for circulation of coolant, and conduit and flexible cable ports for electrical interconnects;

a platform disposed in said base portion of said enclosure on which microcomputer electronic boards, magnetic disc drive and input/output connectors are mounted so as to all be contained within said base portion;

omnidirectional, shock-absorbing, vibration damped mounting means attaching said platform to a bottom wall of said base portion of said enclosure;

a CRT and CRT frame therefor having a base on which a first pair of CRT mounting pins horizontally project from opposite sides and adjacent the rear of said CRT frame base, and a second pair of CRT mounting pins project horizontally and forwardly, orthogonal to said first pair of pins and arranged adjacent the front of said CRT frame base;

first and second pairs of pin capture and support means mounted on internal wall surfaces of said enclosure in registration with said first and second pairs of CRT mounting pins, respectively, such that said CRT and CRT frame install in said hood portion of said enclosure as a unit by an inward insertion and downward pivoting about said first pair of CRT mounting pins captured in said first pair of pin capture and support means said second pair of CRT mounting pins dropping into said second pair of pin capture and support means so as to secure said CRT and CRT frame within said enclosure;

a transparent CRT window secured and sealed about its perimeter in said window casement of said hood portion of said enclosure; and a tactile feedback keyboard mounted and sealed in said keyboard receiving casement at the front of said base portion of said enclosure and internal electrical cabling connecting said keyboard to said electronic boards mounted on said platform.

* * * * *